US009166469B2

(12) United States Patent
Familiant et al.

(10) Patent No.: US 9,166,469 B2
(45) Date of Patent: Oct. 20, 2015

(54) SYSTEM FOR OPTIMIZING SWITCHING DEAD-TIME AND METHOD OF MAKING SAME

(75) Inventors: Yakov Lvovich Familiant, Brown Deer, WI (US); Huaqiang Li, Menomonee Falls, WI (US); Xiaoling Li, Shenzhen (CN); Leo Sun, Shenzhen (CN)

(73) Assignee: Eaton Corporation, Cleveland, OH (US)

( * ) Notice: Subject to any disclaimer, the term of this patent is extended or adjusted under 35 U.S.C. 154(b) by 465 days.

(21) Appl. No.: 13/597,552

(22) Filed: Aug. 29, 2012

(65) Prior Publication Data

US 2014/0063883 A1    Mar. 6, 2014

(51) Int. Cl.
*H02M 1/088* (2006.01)
*H02M 1/38* (2007.01)
*H02M 1/08* (2006.01)

(52) U.S. Cl.
CPC ........ *H02M 1/38* (2013.01); *H02M 1/08* (2013.01); *H02M 1/088* (2013.01)

(58) Field of Classification Search
CPC ....... H02M 1/38; H02M 3/1588; H02M 1/08; H02M 1/00; H02M 1/088; Y02B 70/1466; H03L 5/00; H03K 17/082
USPC ................................. 363/95, 97, 98, 131, 132
See application file for complete search history.

(56) References Cited

U.S. PATENT DOCUMENTS

| 4,796,145 | A | | 1/1989 | Oshikiri | |
|---|---|---|---|---|---|
| 5,099,138 | A | * | 3/1992 | Fukunaga | 327/109 |
| 5,930,132 | A | | 7/1999 | Watanabe et al. | |
| 6,897,682 | B2 | * | 5/2005 | Nadd | 326/83 |
| 2002/0089321 | A1 | | 7/2002 | Matsuda | |
| 2003/0048648 | A1 | * | 3/2003 | Lin et al. | 363/65 |
| 2004/0196669 | A1 | * | 10/2004 | Thrap | 363/19 |
| 2007/0069236 | A1 | | 3/2007 | Capodivacca et al. | |

(Continued)

FOREIGN PATENT DOCUMENTS

| DE | 4032014 A1 | 5/1991 |
|---|---|---|
| WO | 8801804 A1 | 3/1988 |

OTHER PUBLICATIONS

International Search Report and Written Opinion from corresponding PCT/US2013/056086, dated Feb. 26, 2014.

(Continued)

*Primary Examiner* — Fred E Finch, III
*Assistant Examiner* — Gustavo Rosario Benitez
(74) *Attorney, Agent, or Firm* — Ziolkowski Patent Solutions Group, SC (57) ABSTRACT

A system for optimizing switching dead-time includes a power converter that includes a half-bridge circuit comprising a first switch coupled in series with a second switch, first and second state detection circuits respectively coupled to the first and second switches and configured to respectively detect an activation state of the first and second switches. First and second switch control circuits coupled respectively to the first and second switches are configured to respectively toggle the first and second switches between an activate state and a deactivated state. The first switch control circuit includes a first input configured to receive an activation signal from the second state detection circuit indicative of the activation state of the second switch, and the second switch control circuit includes a first input configured to receive an activation signal from the first state detection circuit indicative of the activation state of the first switch.

17 Claims, 5 Drawing Sheets

(56) References Cited

U.S. PATENT DOCUMENTS

2007/0085589 A1    4/2007  Yoshikawa
2012/0287545 A1* 11/2012  Tran et al. .................... 361/101

OTHER PUBLICATIONS

Leggate et al., "Pulse Based Dead Time Compensator for PWM Voltage Inverters," Industrial Electronics, IEEE Transactions, vol. 44, Issue 2, Apr. 1997, pp. 1-8.

Arias et al.,"Hard-Less Dead-Time Compensator for PWM Voltage Inverters," Industrial Electronics Society, 1998. IECON '98. Proceedings of the 24th Annual Conference of the IEEE, vol. 2, No. 31, Aug. 4, Sep. 1998, pp. 780-785.

Munoz et al., "On-Line Dead Time Compensation Technique for Open-Loop PWM-VSI Drives," Power Electronics, IEEE Transactions, vol. 14, Issue 4, Jul. 1999, pp. 95-100.

"Description and Application Manual for Scale Drivers," CT-Concept Technology Ltd., Intelligent Power Electronics, pp. 1-32.

* cited by examiner

SYSTEM FOR OPTIMIZING SWITCHING DEAD-TIME AND METHOD OF MAKING SAME

BACKGROUND OF THE INVENTION

Embodiments of the invention relate generally to electronic converters and, more particularly, to a system for optimizing switching dead-time in a multi-switch power converter.

Figure 1:
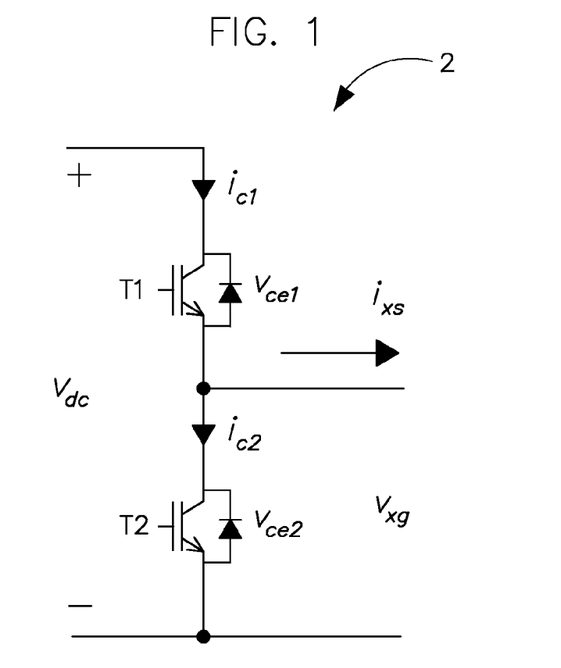
FIG. 1 is a circuit diagram of a known half-bridge circuit topology of a fundamental building block for a power converter.

FIG. 1 illustrates a known half-bridge circuit topology 2 of a fundamental building block for a power converter. Half-bridge circuit 2 includes a pair of switches T1, T2 that may be controlled in according to a pulse-width modulation (PWM) scheme to convert DC voltage ($v_{dc}$) to an AC waveform on the voltage output ($v_{out}$) to control an AC load such as an AC motor, for example. In another example, the half-bridge circuit 2 may be used for one phase of a single- or multi-phase DC-to-DC converter.

Typically, switches T1, T2 are operated in an alternating manner in which one switch is an on state while the other switch is in the off state. Controlling which switch is in the on state via the PWM scheme causes the AC waveform on the voltage output ($v_{out}$) to be generated according to a desired frequency.

However, the switching of a switch (e.g., switch T1) from its on state to its off state is not an instantaneous process. That is, it takes some time for switch T1 to stop conducting current therethrough. If the other switch (e.g., switch T2) begins conducting current prior to the shut-off of current through switch T1, a "shoot-through" condition may be created in which the DC voltage ($v_{dc}$) becomes shorted, possibly damaging the voltage source supplying $v_{dc}$.

Figure 2:
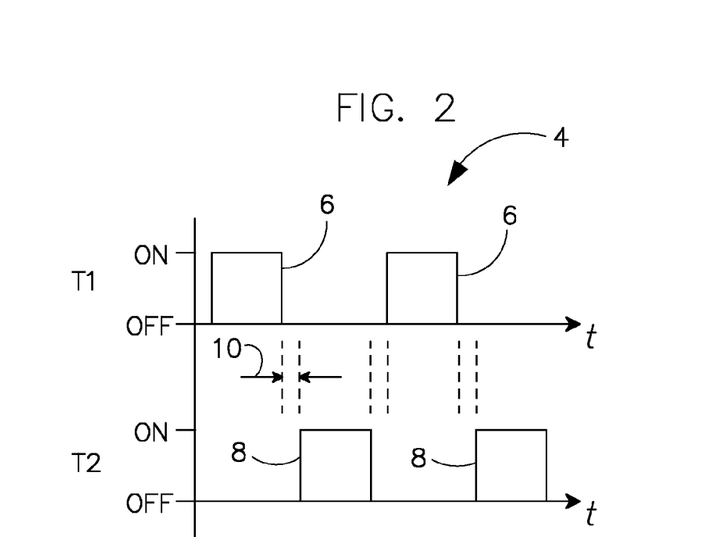
FIG. 2 is a portion of an exemplary PWM pulse sequence for the half-bridge circuit of FIG. 1.

Accordingly, in the traditional implementation of half-bridge circuit 2, a dead-time is calculated and added to the PWM scheme to avoid activating both switches T1, T2 to their on states simultaneously. As shown in FIG. 2, a PWM scheme 4 includes a plurality of pulses 6 for controlling switch T1 between its on and off states and a plurality of pulses 8 for controlling switch T2 between its on and off states. A dead time 10 is inserted between adjacent pulses 6, 8 to avoid creating a shoot-through condition. In this PWM scheme, a multi-channel PWM signal generator having separate controls for respective switches is used to enable dead time generation between separate pulses 6, 8.

The addition of dead time 10 in PWM scheme 4, while avoiding shoot-through, can cause the AC load to function differently than expected as a function of the dead time 10. For example, the dead time may cause the actual rotor flux of an AC adjustable speed drive to have a phase shift from its estimated flux, and the actual motor speed of the adjustable speed drive may be harmonically distorted about the estimated motor speed. In addition, the dead time affects total harmonic distortion of the motor current of the adjustable speed drive.

It would therefore be desirable to have a system for optimizing the dead time to reduce or minimize effects of the dead time on load function.

BRIEF DESCRIPTION OF THE INVENTION

According to one aspect of the invention, a power converter includes a half-bridge circuit comprising a first switch coupled in series with a second switch, a first state detection circuit coupled to the first switch and configured to detect an activation state of the first switch, and a second state detection circuit coupled to the second switch and configured to detect an activation state of the second switch. The power converter also includes a first switch control circuit coupled to the first switch and configured to toggle the first switch between an activate state and a deactivated state, the first switch control circuit comprising a first input configured to receive an activation signal from the second state detection circuit indicative of the activation state of the second switch. A second switch control circuit is included and coupled to the second switch and configured to toggle the second switch between an active state and a deactivated state, the second switch control circuit comprising a first input configured to receive an activation signal from the first state detection circuit indicative of the activation state of the first switch. A system controller is configured to cause a first control signal to be transmitted to a second input of the first switch control circuit and to cause a second control signal to be transmitted to a second input of the second switch control circuit. The first switch control circuit is configured to control the first switch based on the activation signal from the second state detection circuit and based on the first control signal and the second switch control circuit is configured to control the second switch based on the activation signal from the first state detection circuit and based on the second control signal.

According to another aspect of the invention, a method of manufacturing a power converter includes coupling a first state detection circuit to a first switch coupled in series with a second switch and coupling a second state detection circuit to the second switch. The first state detection circuit is configured to detect an activation state of the first switch, and the second state detection circuit is configured to detect an activation state of the second switch. The method also includes coupling a first control circuit to the first switch and configuring the first control circuit to control an activation state of the first switch and to receive an activation signal from the second state detection circuit indicative of the activation state of the second switch. The method also includes coupling a second control circuit to the second switch and configuring the second control circuit to control an activation state of the second switch and receive an activation signal from the first state detection circuit indicative of the activation state of the first switch. The method further includes configuring a system controller to cause transmission of a first control signal to the first control circuit and to cause transmission of a second control signal to the second control circuit, wherein configuring the first control circuit further comprises configuring the first control circuit to control the first switch based on the activation signal from the second state detection circuit and based on the first control signal and wherein configuring the second control circuit further comprises configuring the second control circuit to control the second switch based on the activation signal from the first state detection circuit and based on the second control signal.

According to yet another aspect of the invention, a DC-to-AC converter includes a DC voltage bus, a pair of switches coupled to the DC voltage bus and coupled in series with each other, and a pair of switch controls coupled to the pair of switches, each switch control configured to control an on state and an off state of a respective switch of the pair of switches. A controller is included and configured to cause a first control signal to be supplied to a first switch control of the pair of switch controls and to cause a second control signal to be supplied to a second switch control of the pair of switch controls, wherein the second control signal is an inverse of the first control signal. A pair of state detection circuits are included and coupled to the pair of switches, each state detection circuit configured to detect an activation state of a respective switch of the pair of switches. Each of the pair of switch controls is configured to receive an activation signal indicative of the activation state of a respective switch of the pair of switches and to receive one of the first and second control signals and to control the on state and the off state of the respective switch of the pair of switches coupled thereto based on the received activation signal and based on the received control signal.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Figure 3:
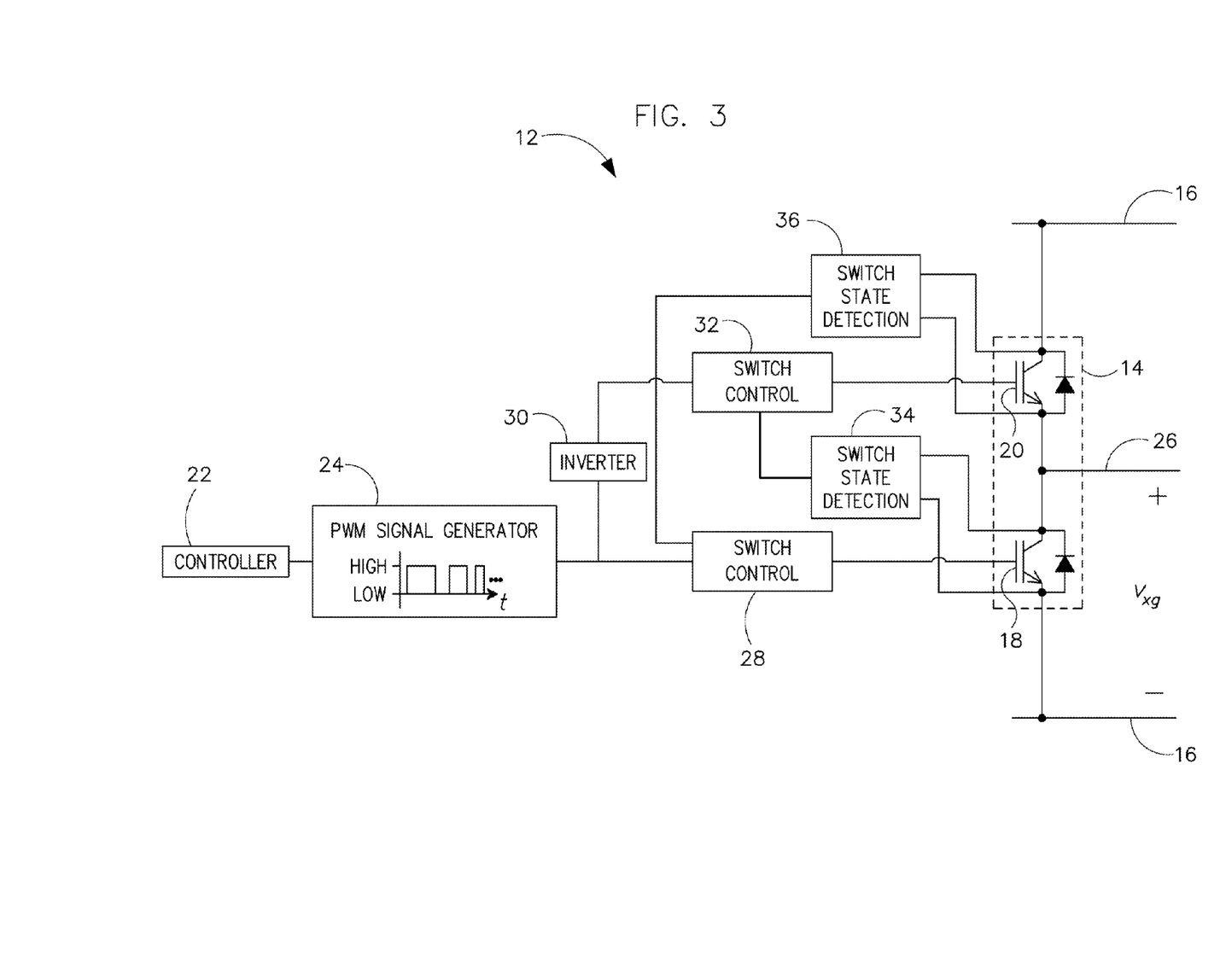
FIG. 3 is a block diagram of a dead-time optimization circuit according to an embodiment of the invention.

FIG. 3 is a block diagram of a dead-time optimization circuit 12 according to an embodiment of the invention. Dead-time optimization circuit 12 includes a half-bridge circuit 14 similar to half-bridge circuit 2 shown in FIG. 1 for converting a DC voltage on a DC voltage bus 16 to an AC voltage through appropriate switching of a pair of switches 18, 20 of half-bridge circuit 14. In one embodiment, switches 18, 20 are insulated gate bipolar transistors (IGBTs) as shown. However, other embodiments of the invention contemplate other power switching devices as known in the art.

A system controller 22 is shown coupled to a PWM signal generator 24 for generating a PWM signal configured to control switches 18, 20 according to a PWM scheme designed to convert a DC voltage on DC voltage bus 16 to an AC output voltage on an output voltage line 26 of half-bridge circuit 14. The PWM signal generated by generator 24 is input to a first switch control 28 coupled to switch 18, and an inverter 30 configured to invert the PWM signal outputs the inverted PWM signal to a second switch control 32 coupled to switch 20. According to one embodiment, the PWM signal generated for controlling switches 18, 20 is a single signal designed to control both switches 18, 20.

However, prior to controlling a switch 18, 20 to its on or active state, first and second switch controls 28, 32 receive a signal indicating that the opposite switch (i.e., the switch not directly controlled thereby on the alternate channel) is not conducting current therethrough and thus a condition is satisfied for controlling the attached switch 18, 20 to its on state without creating a shoot-through condition. That is, a first switch state detection block 34 detects if current is flowing through switch 18 and sends an activation signal to second switch control 32 that indicates the activation state of switch 18. For example, the activation signal indicates whether switch 18 is in an on state conducting current or if it is in an off or deactivated state and not passing current therethrough. Similarly, a second switch state detection block 36 detects if current is flowing through switch 20 and sends a signal to second switch control 28 that indicates whether switch 20 is in an on state conducting current or if it is in an off state and not passing current therethrough.

In an operating example according to one embodiment, PWM signal generator 24 may deliver a signal configured to cause first switch control 28 to activate switch 18 and to cause second switch control 32 via inverter 30 to de-activate switch 20. Though first switch control 28 receives the control to activate switch 18, an activation signal from first switch control 28 to switch 18 is not sent until a signal is received from second switch state detection 36 that current is not flowing through switch 20 and that switch 20 is in an off state. If switch 20 had been operating in an on state, the command to switch to its off state is not instantaneous but will take a small amount of time. When the small amount of time passes for switch 20 to transition to its off state, second switch state detection 36 will send the indication signal to first switch control 28 that switch 20 is off, and first switch control 28 will then control switch 18 to switch from its off state to its on state. This small amount of time is thus substantially equal to the transition of switch 20 from its on state to its off state. Because the transition from an on state to an off state of switch 20 is detected rather than pre-programmed, a predetermined and programmed dead time to delay the switching of switch 18 from its off state to its on state is eliminated. In this manner, the dead time that occurs between the commanding of switch 20 to turn off and the commanding of switch 18 to turn on is automatically minimized. In addition, variability in the dead time due to performance of half-bridge circuit 14 and other factors is also taken into account.

Figure 4:
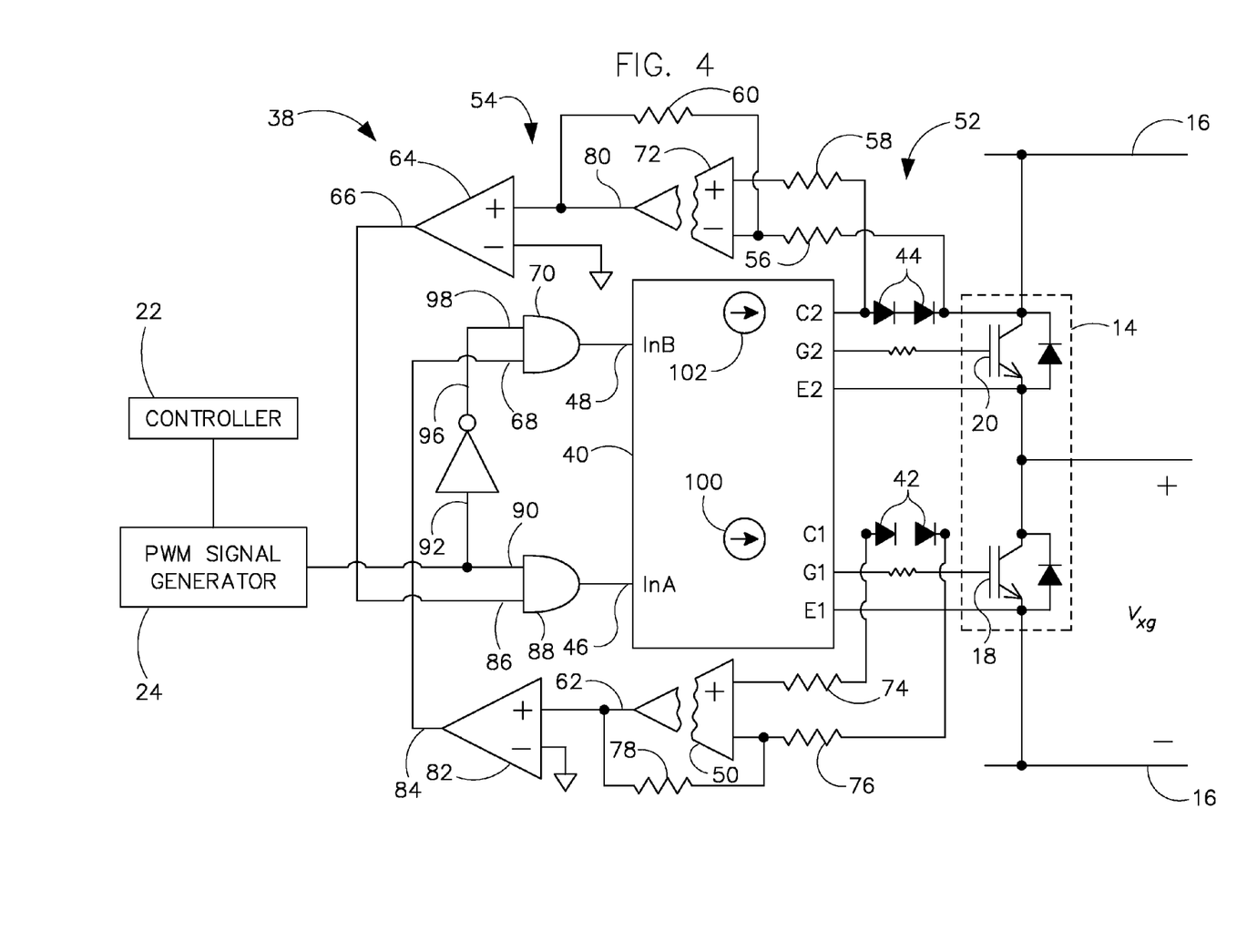
FIG. 4 is a schematic illustration of the dead-time optimization circuit of FIG. 3 according to an embodiment of the invention.

FIG. 4 illustrates a schematic circuit diagram 38 of the dead-time optimization circuit of FIG. 3 according to an embodiment of the invention. Circuit 38 includes half-bridge circuit 14 for converting a DC voltage on DC voltage bus 16 to an AC voltage through appropriate switching of switches 18, 20 of half-bridge circuit 14. In one embodiment, switches 18, 20 are insulated gate bipolar transistors (IGBTs) as shown. However, other embodiments of the invention contemplate other power switching devices as known in the art.

A multi-channel desaturation detector circuit 40 is coupled to half-bridge circuit 14 and protects half-bridge circuit 14 from overload and short-circuit conditions. Desaturation detector circuit 40 operates based on measurement of collector-emitter voltage, which depends on collector current. For over-current protection, desaturation detector circuit 40 may be designed to withstand voltage up to 40% higher than the voltage of DC voltage bus 16 by connecting one or more diodes 42, 44 of respective desaturation detector circuit channels 46, 48 in series. In one embodiment, desaturation detector circuit 40 is a commercially available gate drive.

Dead-time optimization circuit 38 includes a first amplifier 50 coupled to diodes 42 serving as current-to-voltage devices to detect a voltage thereacross. First amplifier 50 may be a high impedance differential amplifier in one embodiment configured to isolate a power or secondary side 52 of desaturation detector circuit 40 from a control or primary side 54 thereof. As illustrated, a plurality of resistors 56, 58, 60 is coupled to first amplifier 50 to form a non-inverting amplifier circuit. An output 62 of first amplifier 50 is coupled to a comparator 64 having an output 66 coupled to a first input 68 of a logic AND gate 70 coupled to opposite channel 48. A second amplifier 72 is coupled to diodes 44 serving as current-to-voltage devices to detect a voltage thereacross and may be a high impedance differential amplifier configured to isolate power side 52 from control side 54 thereof. A plurality of resistors 74, 76, 78 is coupled to second amplifier 72 to form a non-inverting amplifier circuit. An output 80 of second amplifier 72 is coupled to a comparator 82 having an output 84 coupled to a first input 86 of a logic AND gate 88 coupled to opposite channel 46.

In one embodiment, amplifiers 50, 72 may be configured to output a logic 1 signal to respective inputs 68, 86 of logic AND gates 70, 88 when the voltage across respective diodes 42, 44 is zero or otherwise indicates that the respective switch 18, 20 is in an off state. Alternatively, amplifiers 50, 72 may be configured to output a logic 0 signal that is inverted by a logic NOT gate or other inverter (not shown) or by inverting the logic of inputs 68, 86.

In an operating example according to one embodiment, PWM signal generator 24 is controlled by controller 22 to output a PWM signal to a second input 90 of logic AND gate 88 and to an input 92 of a logic NOT gate 94 or other type of signal inverter. An output 96 of logic NOT gate 94 is coupled to a second input 98 of logic AND gate 70. Separate current sources 100, 102 inside desaturation detector circuit 40 is configured to output a current on collector outputs C1, C2 of circuit 40. The output current flows through respective diodes 42, 44 and switches 18, 20 when the respective switch 18, 20 is in the on state. The current flowing through diodes 42 or 44 creates a voltage thereacross that is detected by amplifier 50 or 72, indicating that the respective switch 18, 20 is in the on state. While the switch is on, the logic signal received by logic AND gates 70 or 88 indicates the on state of the switch. When the PWM signal from PWM signal generator 24 causes the gate output G1 or G2 to turn a respective switch 18 or 20 to its off state, the output current flowing through the respective diodes 42, 44 ceases when the respective switch 18, 20 makes the transition to its off state. In this case, a reverse voltage is created across diodes 42 or 44, and the logic signal received by logic AND gate 70 or 88 from amplifiers 50 or 72 indicates the off state of the switch. This off-state logic signal, combined with a PWM signal to activate a desired switch 18 or 20, causes desaturation detector circuit 40 to activate the desired switch 18 or 20 after the time (i.e., dead time) delay of the opposite switch 20 or 18 to turn off.

Figure 5:
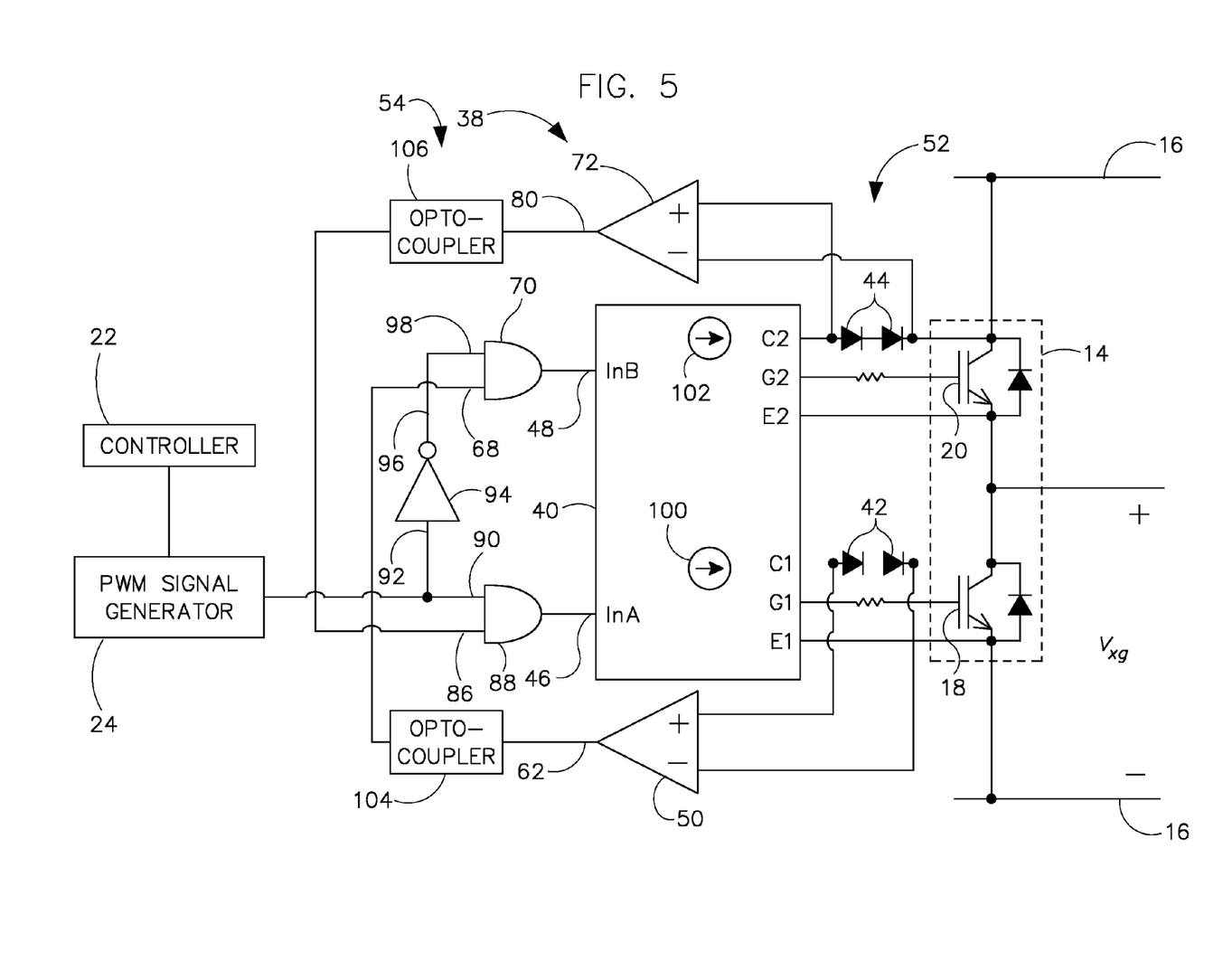
FIG. 5 is a schematic illustration of the dead-time optimization circuit of FIG. 3 according to another embodiment of the invention.

FIG. 5 illustrates another embodiment of the dead-time optimization circuit 38 illustrated in FIG. 3. As shown in FIG. 5, amplifiers 50, 72 may be comparators coupled to isolation devices 104, 106 for isolating power side 52 of circuit 38 from control side 54 of circuit 38. Other components illustrated are described above with respect to FIG. 4.

Figure 6:
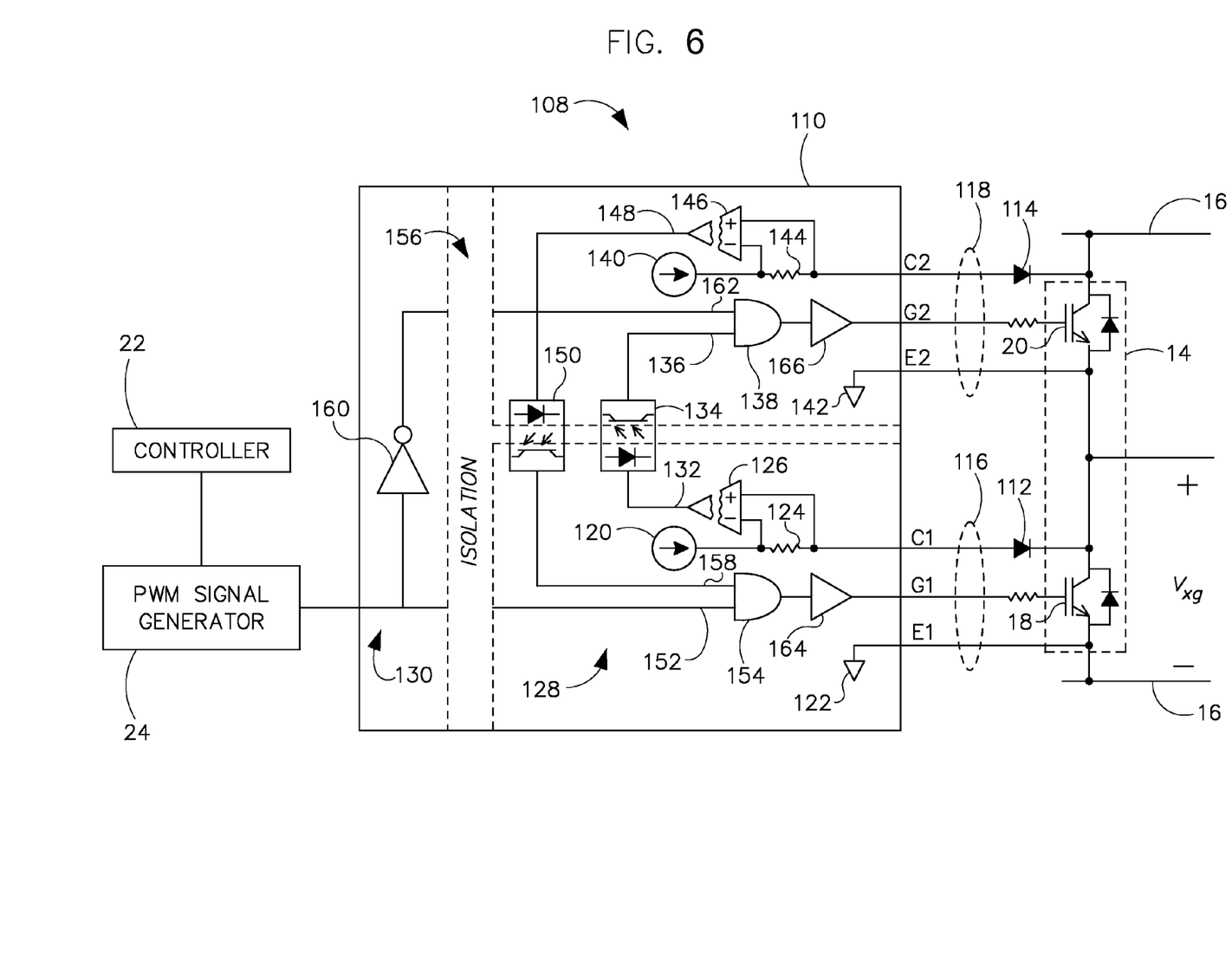
FIG. 6 is a schematic illustration of the dead-time optimization circuit of FIG. 3 according to another embodiment of the invention.

FIG. 6 illustrates a schematic circuit diagram 108 of the dead-time optimization circuit of FIG. 3 according to another embodiment of the invention. Circuit 108 includes half-bridge circuit 14 for converting a DC voltage on DC voltage bus 16 to an AC voltage through appropriate switching of switches 18, 20 of half-bridge circuit 14. In one embodiment, switches 18, 20 are insulated gate bipolar transistors (IGBTs) as shown. However, other embodiments of the invention contemplate other power switching devices as known in the art.

A multi-channel gate drive circuit 110 according to an embodiment of the invention is coupled to half-bridge circuit 14. Gate drive circuit 110 operates based on measurement of collector-emitter voltage, which depends on collector current. Gate drive circuit 110 may be designed to withstand voltages higher than the voltage of DC voltage bus 16 by connecting one or more diodes 112, 114 of respective gate drive circuit channels 116, 118 in series. In one embodiment, gate drive circuit 110 may be built in-house or may be a gate drive commercially available having the features described herein.

Gate drive circuit 110 includes a first current source 120 configured to supply a current to switch 18, which, in an on state, passes the current therethrough and back to a local ground 122. In an off state, the current from current source 120 does not flow through switch 18. A current-to-voltage device 124, such as a resistor, has a voltage thereacross when the current from current source 120 passes through switch 18 in the on state.

A first amplifier 126 coupled to resistor 124 detects the voltage thereacross. First amplifier 126 may be a high impedance differential amplifier in one embodiment configured to isolate a power or secondary side 128 of gate drive circuit 110 from a control or primary side 130 thereof. Alternatively, first amplifier 126 may be a comparator/isolator combination as described above with respect to FIG. 5. An output 132 of first amplifier 126 is coupled to an optocoupler 134 or other equivalent isolation device to provide isolation between channels 116, 118. Optocoupler 134 is coupled to a first input 136 of a logic AND gate 138 coupled to opposite channel 118.

A second current source 140 configured to supply a current to switch 20, which, in an on state, passes the current therethrough and back to a local ground 142. In an off state, the current from current source 140 does not flow through switch 20. A current-to-voltage device 144, such as a resistor, has a voltage thereacross when the current from current source 140 passes through switch 20 in the on state.

A second amplifier 146 is coupled to 144 detects a voltage thereacross. Second amplifier 146 may be a high impedance differential amplifier may be a high impedance differential amplifier in one embodiment configured to isolate power side 128 from control side 130. Alternatively, second amplifier 146 may be a comparator/isolator combination as described above with respect to FIG. 5. An output 148 of second amplifier 146 is coupled to an optocoupler 150 or other equivalent isolation device to provide isolation between channels 116, 118. Optocoupler 150 is coupled to a first input 152 of a logic AND gate 154 coupled to opposite channel 116.

Amplifiers 126, 146 are configured together with optocouplers 134, 150 to output a logic 1 signal to respective inputs 136, 152 of logic AND gates 138, 154 when the voltage across respective resistors 134, 144 is zero or otherwise indicates that the respective switch 18, 20 is in an off state. Alternatively, amplifiers 126, 146 may be configured to output a logic 0 signal that is inverted by a NOT gate or other inverter (not shown) or by inverting the logic of inputs 136, 152.

In an operating example according to one embodiment, PWM signal generator 24 is controlled by controller 22 to output a PWM signal across an isolation 156 of gate drive circuit 110 to a second input 158 of logic AND gate 154 and to output an inversion thereof via a logic NOT gate 160 or other type of signal inverter across isolation 156 to a second input 162 of logic AND gate 138. Current sources 120, 140 are configured to output a current on collector outputs C1, C2 of circuit 110. The output current flows through respective resistors 124, 144 and switches 18, 20 when the respective switch 18, 20 is in the on state. The current flowing through resistors 124 or 144 creates a voltage thereacross that is detected by amplifier 126 or 146, indicating that the respective switch 18, 20 is in the on state. While the switch is on, the logic signal received by logic AND gates 138 or 154 indicates the on state of the switch. When the PWM signal from PWM signal generator 24 causes the gate output G1 or G2 from a respective switch control driver 164, 166 to turn a respective switch 18 or 20 to its off state, the output current flowing through the respective resistors 124, 144 ceases when the respective switch 18, 20 makes the transition to its off state. In this case, no voltage is created across resistors 124 or 144, and the logic signal received by logic AND gate 138 or 154 from amplifiers 126 or 146 indicates the off state of the switch. This off-state logic signal, combined with a PWM signal to activate a desired switch 18 or 20, causes gate drive circuit 110 to activate the desired switch 18 or 20 after the time (i.e., dead time) delay of the opposite switch 20 or 18 to turn off.

While not illustrated, gate drive circuit 110 may be configured to provide a desaturation detector circuit coupled to half-bridge circuit 14 to protect half-bridge circuit 14 from overload and short-circuit conditions as known in the art.

Therefore, according to one embodiment of the invention, a power converter includes a half-bridge circuit comprising a first switch coupled in series with a second switch, a first state detection circuit coupled to the first switch and configured to detect an activation state of the first switch, and a second state detection circuit coupled to the second switch and configured to detect an activation state of the second switch. The power converter also includes a first switch control circuit coupled to the first switch and configured to toggle the first switch between an activate state and a deactivated state, the first switch control circuit comprising a first input configured to receive an activation signal from the second state detection circuit indicative of the activation state of the second switch. A second switch control circuit is included and coupled to the second switch and configured to toggle the second switch between an active state and a deactivated state, the second switch control circuit comprising a first input configured to receive an activation signal from the first state detection circuit indicative of the activation state of the first switch. A system controller is configured to cause a first control signal to be transmitted to a second input of the first switch control circuit and to cause a second control signal to be transmitted to a second input of the second switch control circuit. The first switch control circuit is configured to control the first switch based on the activation signal from the second state detection circuit and based on the first control signal and the second switch control circuit is configured to control the second switch based on the activation signal from the first state detection circuit and based on the second control signal.

According to another embodiment of the invention, a method of manufacturing a power converter includes coupling a first state detection circuit to a first switch coupled in series with a second switch and coupling a second state detection circuit to the second switch. The first state detection circuit is configured to detect an activation state of the first switch, and the second state detection circuit is configured to detect an activation state of the second switch. The method also includes coupling a first control circuit to the first switch and configuring the first control circuit to control an activation state of the first switch and to receive an activation signal from the second state detection circuit indicative of the activation state of the second switch. The method also includes coupling a second control circuit to the second switch and configuring the second control circuit to control an activation state of the second switch and receive an activation signal from the first state detection circuit indicative of the activation state of the first switch. The method further includes configuring a system controller to cause transmission of a first control signal to the first control circuit and to cause transmission of a second control signal to the second control circuit, wherein configuring the first control circuit further comprises configuring the first control circuit to control the first switch based on the activation signal from the second state detection circuit and based on the first control signal and wherein configuring the second control circuit further comprises configuring the second control circuit to control the second switch based on the activation signal from the first state detection circuit and based on the second control signal.

According to yet another embodiment of the invention, a DC-to-AC converter includes a DC voltage bus, a pair of switches coupled to the DC voltage bus and coupled in series with each other, and a pair of switch controls coupled to the pair of switches, each switch control configured to control an on state and an off state of a respective switch of the pair of switches. A controller is included and configured to cause a first control signal to be supplied to a first switch control of the pair of switch controls and to cause a second control signal to be supplied to a second switch control of the pair of switch controls, wherein the second control signal is an inverse of the first control signal. A pair of state detection circuits are included and coupled to the pair of switches, each state detection circuit configured to detect an activation state of a respective switch of the pair of switches. Each of the pair of switch controls is configured to receive an activation signal indicative of the activation state of a respective switch of the pair of switches and to receive one of the first and second control signals and to control the on state and the off state of the respective switch of the pair of switches coupled thereto based on the received activation signal and based on the received control signal.

Embodiments of the present invention have been described in terms of the preferred embodiment, and it is recognized that equivalents, alternatives, and modifications, aside from those expressly stated, are possible and within the scope of the appending claims.

What is claimed is:

1. A power converter comprising:
   a half-bridge circuit comprising a first switch coupled in series with a second switch;
   a first state detection circuit coupled to the first switch and configured to detect an activation state of the first switch, the first state detection circuit comprising:
     a first current source coupled to a first current-to-voltage device; and
     a first high impedance differential amplifier coupled to the first current-to-voltage device and configured to generate an activation signal from the first state detection circuit; and
   a second state detection circuit coupled to the second switch and configured to detect an activation state of the second switch, the second state detection circuit comprising:
     a second current source coupled to a second current-to-voltage device; and
     a second high impedance differential amplifier coupled to the second current-to-voltage device and configured to generate an activation signal from the second state detection circuit;
   a first switch control circuit coupled to the first switch and configured to toggle the first switch between an activate state and a deactivated state, the first switch control circuit comprising a first input configured to receive the activation signal from the second state detection circuit indicative of the activation state of the second switch;
   a second switch control circuit coupled to the second switch and configured to toggle the second switch between an active state and a deactivated state, the second switch control circuit comprising a first input configured to receive the activation signal from the first state detection circuit indicative of the activation state of the first switch;

a system controller configured to:
  cause a first control signal to be transmitted to a second input of the first switch control circuit; and
  cause a second control signal to be transmitted to a second input of the second switch control circuit;
wherein the first switch control circuit is configured to control the first switch based on the activation signal from the second state detection circuit and based on the first control signal; and
wherein the second switch control circuit is configured to control the second switch based on the activation signal from the first state detection circuit and based on the second control signal.

2. The power converter of claim 1 further comprising a signal generator coupled to the system controller and to the first switch control circuit; and
  wherein the system controller, in being configured to cause a first control signal to be transmitted to a second input of the first switch control circuit, is configured to cause the signal generator to generate the first control signal and to supply the first control signal to the first switch control circuit.

3. The power converter of claim 2 further comprising a signal inverter coupled to the signal generator and to the second switch control circuit; and
  where in the signal inverter is configured to:
    invert the first control signal to generate the second control signal; and
    supply the second control signal to the second switch control unit.

4. The power converter of claim 3 wherein the signal inverter comprises a logic NOT gate.

5. The power converter of claim 2 wherein the signal generator comprises a pulse-width modulation signal generator.

6. The power converter of claim 1 wherein the first switch control circuit comprises a first logic AND gate comprising the first and second inputs of the first switch control circuit; and
  wherein the second switch control circuit comprises a second logic AND gate comprising the first and second inputs of the second switch control circuit.

7. The power converter of claim 6 wherein the first and second logic AND gates are coupled to a multi-channel desaturation detector circuit.

8. The power converter of claim 6 further comprising:
  a first switch control driver coupled to the first logic AND gate and to the first switch; and
  a second switch control driver coupled to the second logic AND gate and to the second switch.

9. The power converter claim 1 further comprising:
  a first optocoupler coupled between the first voltage detection device and the second switch control circuit and configured to isolate the first voltage detection device from the second switch control circuit; and
  a second optocoupler coupled between the second voltage detection device and the first switch control circuit and configured to isolate the second voltage detection device from the first switch control circuit.

10. A method of manufacturing a power converter comprising:
  coupling a first state detection circuit to a first switch coupled in series with a second switch, the first state detection circuit configured to detect an activation state of the first switch, coupling the first state detection circuit to the first switch comprising:
    coupling a first non-inverting amplifier circuit to a first current-to-voltage device configured to have a voltage thereacross when the first switch is in an active state and to have no voltage thereacross when the first switch is in the deactivated state;
  coupling a second state detection circuit to the second switch, the second state detection circuit configured to detect an activation state of the second switch, coupling the second state detection circuit to the second switch comprising:
    coupling a second non-inverting amplifier circuit to a second current-to-voltage device configured to have a voltage thereacross when the second switch is in an active state and to have no voltage thereacross when the second switch is in the deactivated state;
  coupling a first control circuit to the first switch and configuring the first control circuit to:
    control an activation state of the first switch; and
    receive an activation signal from the second state detection circuit indicative of the activation state of the second switch;
  coupling a second control circuit to the second switch and configuring the second control circuit to:
    control an activation state of the second switch; and
    receive an activation signal from the first state detection circuit indicative of the activation state of the first switch;
  configuring a system controller to:
    cause transmission of a first control signal to the first control circuit; and
    cause transmission of a second control signal to the second control circuit;
  wherein configuring the first control circuit further comprises configuring the first control circuit to control the first switch based on the activation signal from the second state detection circuit and based on the first control signal; and
  wherein configuring the second control circuit further comprises configuring the second control circuit to control the second switch based on the activation signal from the first state detection circuit and based on the second control signal.

11. The method of claim 10 further comprising:
coupling a signal inverter to the second control circuit;
coupling a signal generator to the first control circuit and to the signal inverter; and
configuring the system controller to cause the signal generator to transmit the first control signal to the first control unit and to the signal inverter, wherein the signal inverter is configured to
  invert the first control signal to generate the second control signal; and
  transmit the second control signal to the second control circuit.

12. The method of claim 10 further comprising coupling the first and second switches to a DC voltage bus; and
  configuring the system controller to cause transmission of the first and second control signals to cause the first and second switches to invert a DC voltage on the DC voltage bus to an AC voltage.

13. The method of claim 10 wherein coupling the first control circuit to the first switch comprises coupling a first logic AND gate to a first switch control driver, the first logic AND gate configured to receive the activation signal from the second state detection circuit and the first control signal; and
  wherein coupling the second control circuit to the second switch comprises coupling a second logic AND gate to a second switch control driver, the second logic AND gate configured to receive the activation signal from the first state detection circuit and the second control signal.

14. A DC-to-AC converter comprising:
a DC voltage bus;
a pair of switches coupled to the DC voltage bus and coupled in series with each other;
a pair of switch controls coupled to the pair of switches, each switch control configured to control an on state and an off state of a respective switch of the pair of switches;
a controller configured to:
cause a first control signal to be supplied to a first switch control of the pair of switch controls; and
cause a second control signal to be supplied to a second switch control of the pair of switch controls, wherein the second control signal is an inverse of the first control signal;
a pair of state detection circuits coupled to the pair of switches, each state detection circuit configured to detect an activation state of a respective switch of the pair of switches, each state detection circuit comprising:
a current source coupled to a current-to-voltage device; and
a high impedance differential amplifier coupled to the current-to-voltage device and configured to generate an activation signal for a respective switch of the pair of switches from the state detection circuit;
wherein each of the pair of switch controls is configured to:
receive the activation signal indicative of the activation state of a respective switch of the pair of switches and to receive one of the first and second control signals; and
control the on state and the off state of the respective switch of the pair of switches coupled thereto based on the received activation signal and based on the received control signal.

15. The DC-to-AC converter of claim 14 wherein each switch control is configured to control the respective switch coupled thereto to an on state after a period of delay after the received control signal is received to activate the respective switch.

16. The DC-to-AC converter of claim 15 wherein the period of delay is based on a time period substantially equal to a transition of the switch other than the respective switch coupled thereto from its on state to its off state.

17. The DC-to-AC converter of claim 16 wherein the period of delay is configured to prevent a shoot-through condition of the pair of switches and is variable based on the time period.

* * * * *